United States Patent [19]
Reynolds

[11] 3,856,066
[45] Dec. 24, 1974

[54] WASHER DEVICE
[75] Inventor: Richard L. Reynolds, Carpentersville, Ill.
[73] Assignee: Illinois Tool Works Inc., Chicago, Ill.
[22] Filed: May 10, 1973
[21] Appl. No.: 359,035

Related U.S. Application Data
[63] Continuation of Ser. No. 169,228, Aug. 5, 1971, abandoned.

[52] U.S. Cl. ............................................. 151/38
[51] Int. Cl. .................................... F16b 39/24
[58] Field of Search ................................. 151/38

[56] References Cited
UNITED STATES PATENTS
| | | | |
|---|---|---|---|
| 551,043 | 12/1895 | Otto | 151/38 |
| 3,628,584 | 12/1971 | Gutshall | 151/38 |

Primary Examiner—Edward C. Allen
Attorney, Agent, or Firm—Olson, Trexler, Wolters, Bushnell & Fosse, Ltd.

[57] ABSTRACT

The present invention relates generally to improvements in spring type washers and more particularly to improvements in spring type washers which incorporate a central polygonally shaped section extending axially beyond an outer dished annular section. The embodiment of the invention disclosed herein includes a short rigid strut section integrally joining the inner and outer washer body sections and portions of the strut sections in the form of ribs are located intermediate the corners of the polygonally shaped body section. These ribs serve to counteract washer clamping forces which under certain conditions might otherwise tend to distort and thereby affect the satisfactory functioning of the strut section.

1 Claim, 8 Drawing Figures

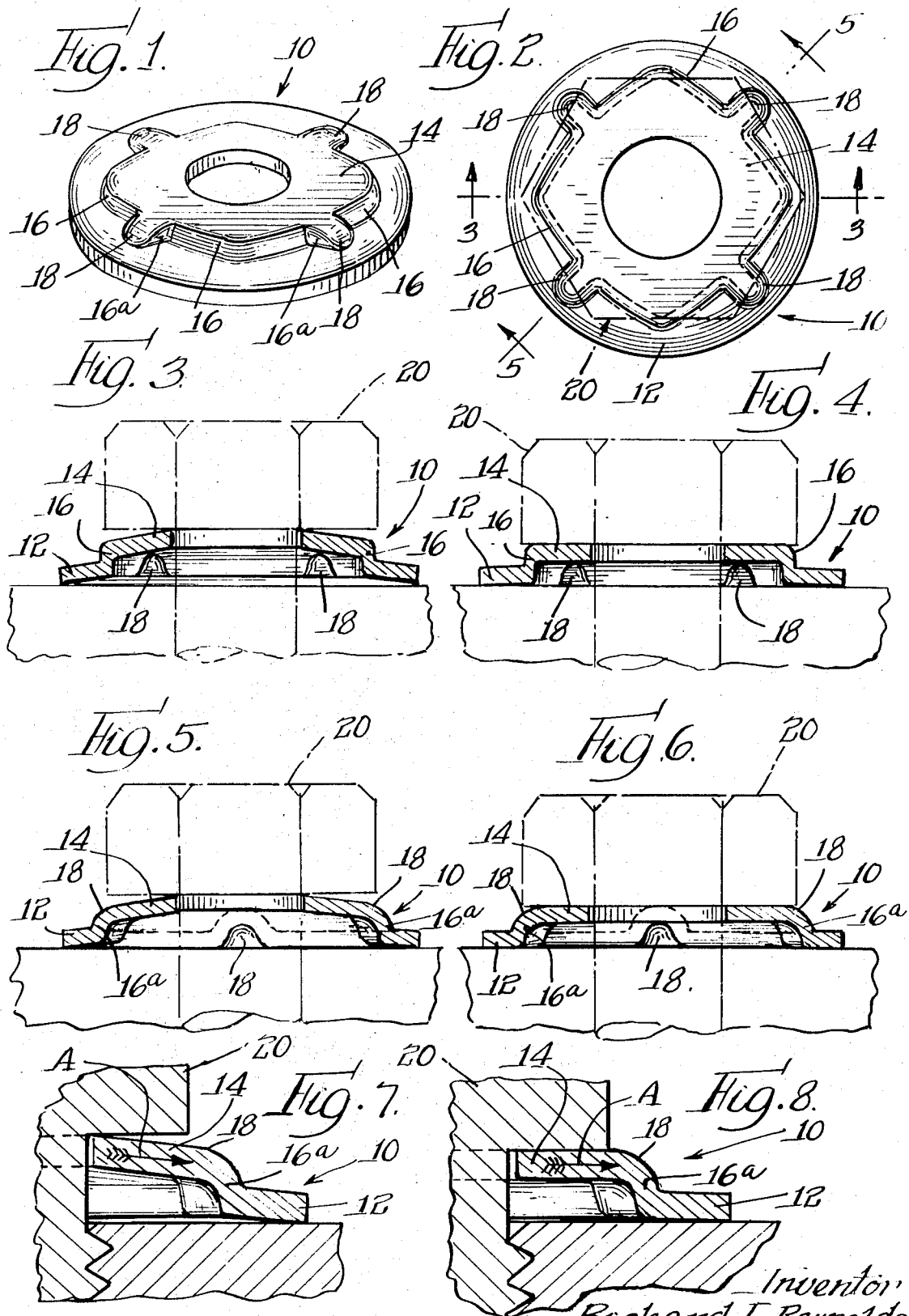

WASHER DEVICE

This is a continuation of application Ser. No. 169,228, filed Aug. 5, 1971 and now abandoned.

SUMMARY OF THE INVENTION

It has been found that heretofore available spring washers of the general type referred to above, when used in association with relatively large apertures in a work piece exhibit a tendency for portions of the strut sections thereof interposed between the inner and outer body portions of the washer to become distorted. Such distortion usually occurs in areas located intermediate the corners of the polygonally shaped body section. The present invention contemplates a spring washer which is especially designed to counteract clamping forces tending to distort the strut section. The invention contemplates such increased resistance to distortion without impairing the required axial yieldability of the washer body.

It is a further object of the present invention to provide a spring washer having the above mentioned desirable functional characteristics wherein an increase in the number of distributed areas of engagement of the clamping surface of a complementary nut or screw head is also provided.

The present invention also contemplates an improved spring type washer member as referred to above wherein uniformity of clamping engagement with a work surface of the outer or circumferential margin of an axially yieldable washer body periphery is assured and the required degree of axial yieldability of the washer body is maintained.

BRIEF DESCRIPTION OF DRAWING

The foregoing and other objects and advantages will be more apparent from the following detailed description when considered in connection with the accompanying drawing wherein:

FIG. 1 is a perspective view of a spring type washer which is representative of one embodiment of the present invention;

FIG. 2 is a plan view of the spring washer shown in FIG. 1;

FIG. 3 is a transverse central sectional view taken substantially along the line 3—3 of FIG. 2, the washer being disclosed before final clamping thereof against a work surface;

FIG. 4 is a central transverse sectional view similar to FIG. 3 disclosing the spring washer after it has been finally clamped against the surface of the workpiece.

FIG. 5 is a central transverse sectional view taken substantially along the line 5—5 of FIG. 2, before final clamping of the washer against a work surface;

FIG. 6 is a sectional view similar to FIG. 5 disclosing the washer in final clamped position;

FIG. 7 is an enlarged fragmentary sectional view of the right-hand portion of the washer as viewed in FIG. 5, said washer being shown in position to be clamped against a work surface by a screw head; and FIG. 8 is an enlarged fragmentary sectional view similar to FIG. 3 disclosing the washer clamped against the work surface.

DESCRIPTION OF A PREFERRED EMBODIMENT OF THE INVENTION

Referring now to the drawing more in detail, wherein like numerals have been employed to designate similar parts throughout the various figures, it will be seen that the present invention contemplates a sheet metal spring-type washer designated generally by the numeral 10. The washer 10 includes an outer circumferentially continuous washer body 12 integrally joined with an inner washer body 14 which is polygonal in shape. The washer bodies 12 and 14 are substantially conical in axial cross-section.

The integral connection between the inner margin of the washer body 12 and the outer margin of the polygonally shaped washer body 14 is in the form of strut sections or portions indicated by the numeral 16. Protuberances 18 located intermediate each pair of corners of the polygonally shaped section 14 provide strut areas 16a which form continuations of the strut sections 16. The protuberances 18 are shown on FIGS. 1, 5 and 7 as including top and side wall portions. The radial outermost extremities of the top and side walls merge with the surface of the washer body 12 inwardly from the outer margin of the washer body 12. These protuberances 18 and the rigid strut portions 16a associated therewith function to lend strength to the outer margin of the polygonal body portion 14 in areas positioned intermediate the corners thereof. This structural feature is of particular significance when the washer is to be used in associated with a relatively large work aperture. If the protuberances 18 and the strut portions 16a formed thereby are not employed, there is a tendency for portions of the strut extending between the corners of the polygonal washer section or body 14 to become distorted in that location, thereby impairing the clamping efficiency of the washer. In fact, without the intermediate strut portion 16a, the concentration of forces in the corners of the polygonal body section has a tendency to cause the strut portions intermediate such corners to flex radially outwardly, or in other words collapse under clamping pressures.

It will also be apparent from the foregoing description that the protuberances 18 provide additional circumferentially spaced areas adapted to be engaged by the clamping surface of a screw head or nut. The major portion of the top walls of the protuberances 18 are essentially narrow continuations of the conical section 14 thus providing the additional clamping surface area. In this manner, the clamping forces exerted against the spring washer are more uniformly distributed, with the result that the outer margin or periphery of the body section 12 will firmly and, in instances where necessary, sealingly engage the work surface.

It will be apparent from the enlarged sectional views in FIGS. 7 and 8, that as pressure is exerted against the washer 10 by a threaded fastener 20, lateral forces acting in the direction of the arrow A are resisted by the protuberances 18, thereby preventing outward radial distortion in the vicinity of the strut portions 16a. The protuberances 18 and their associated strut portions 16a function as buttresses in resisting forces acting normal to the washer axis when the washer is clamped against a work surface. Also, as mentioned above, the protuberances or buttresses 18 provide additional circumferentially distributed surface areas adapted to be contacted by the clamping side of a threaded fastener such as a screw head or nut.

It should also be understood that the circumferential area of the outer conical washer section or body located between each pair of adjacent corners and protuberances is sufficient to insure the required axial yieldability of the washer. It has heretofore been common practice to use spring washers of the type contemplated thereby to clamp a resilient gasket in position against a work surface. Under such circumstances it is extremely important that the outer periphery of the washer be uniformly clamped against the gasket. Lack of uniform clamping engagement of the washer against the gasket may seriously affect the sealing efficiency of the gasket. The provision of the multiple circumferentially spaced protuberances functioning as buttresses assures firm and uniform clamping engagement of the outer washer body against a work surface, as illustrated in FIGS. 4, 6 and 8 of the drawings. The above described protuberances or buttresses 18 may be economically produced by the use of complementary shaped forming dies (not shown). By employing the above-mentioned buttresses in association with the polygonally shaped washer body enables the use of a lighter gauge washer stock without sacrificing clamping or locking efficiency. Hence, spring washers of the type contemplated by the present invention may be produced more economically without impairing the locking and clamping effectiveness thereof. Also the fibers of the strut portions 16 and 16a extend substantially parallel with the washer axis, thereby affording firm resistance to axially directed clamping forces.

I claim:

1. A dual action spring washer including an annular centrally apertured washer body, said body including a first circumferentially continuous outer marginal spring section which is substantially conical in axial cross section and having a circular outer periphery, a second, inner marginal spring section which is substantially conical in axial cross section and extends axially upwardly beyond said first section, the outer periphery of said second section defining a polygon of at leas four sides and which polygonal periphery is spaced radially inwardly of the outer periphery of said first section to provide said outer marginal spring section with a varying width about its circumference, a short, rigid, strut section integrally joining said first and second sections, said strut section extending generally parallel to the washer axis, the strut section including protuberances which are U-shaped in circumferential cross section and located on each side of the polygon intermediate the corners of the polygonally shaped section, each protuberance including a top wall and a pair of side walls extending radially outwardly from the outer periphery of the inner section the outermost extremities of the side walls and top wall merging with the surface of the outer marginal spring section, the outermost extremity of the top wall and side walls providing a bearing surface for the strut section having a periphery greater than the periphery of the polygonal section, the radial distance from the axis of the apertured washer body to the outermost portion of the protuberances being less than the radial distance from the axis of the aperture to the circular periphery of the first outer marginal spring section, the outer spring section thus being provided with an uninterrupted frustoconical marginal spring-like clamping surface extending radially outwardly of the termination point of the protuberances and corners of the polygon, the marginal periphery of the first section lying on a plane which is spaced axially downwardly from the base of the side walls and U-shaped end walls of the protuberances, the inner marginal periphery defining the aperture in the second section lying in a plane which is spaced axially upwardly from the top wall of the protuberance which allows the outer peripheral surface of the outer spring section to yield axially under load, the side walls of the protuberances being extensions of the strut section and the top wall of the protuberances being narrow extensions of the inner conical section providing circumferentially spaced clamping surfaces adapted to be engaged by a clamping surface such as the clamping surface of a rotary threaded fastener and to uniformly distribute the clamping forces in the dual action spring washer system without significantly altering the spring characteristics of either the inner spring section or the outer spring section and significantly decrease the stress concentration at the junctures of the strut with the inner and outer sections.

* * * * *